Patented Sept. 25, 1923.

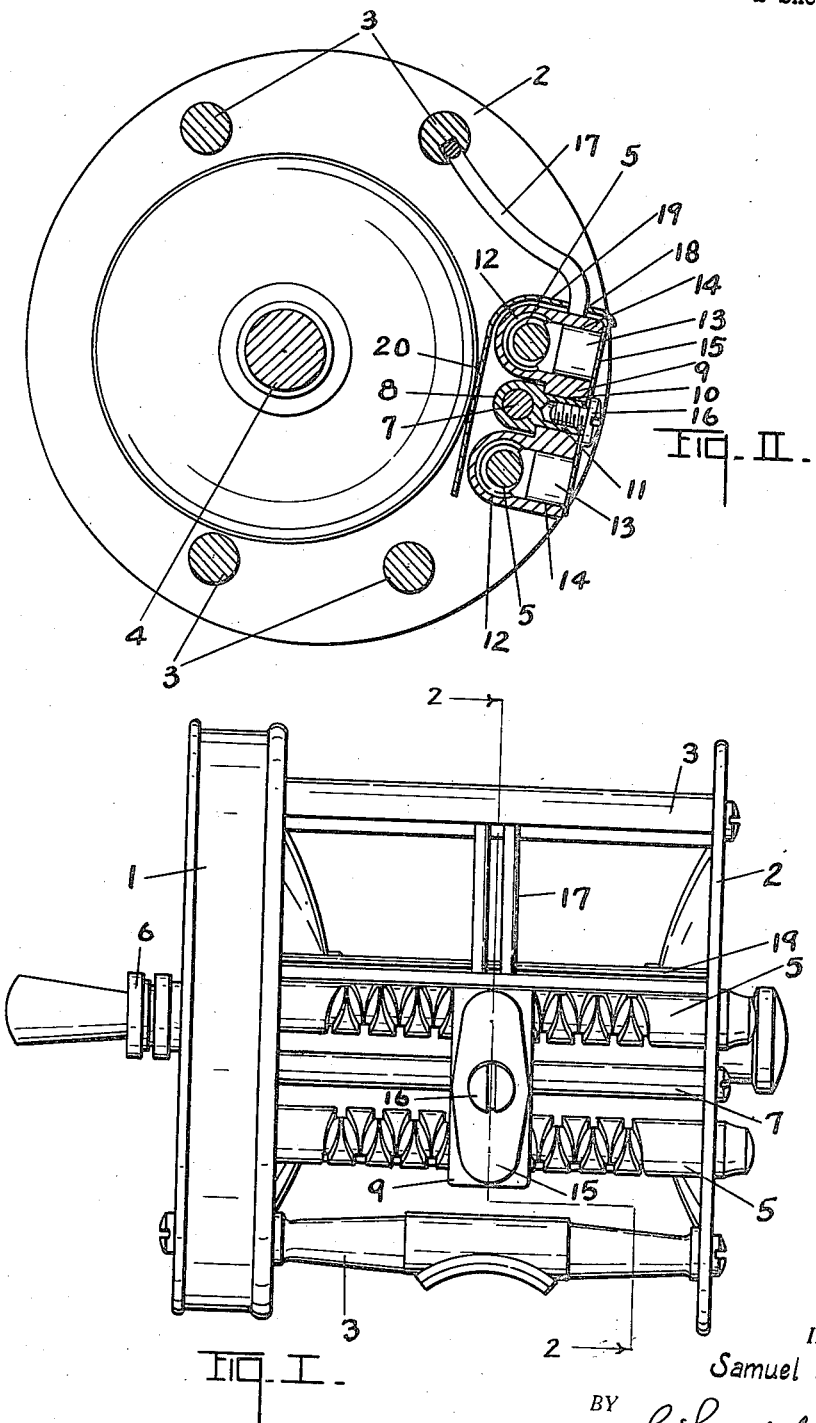

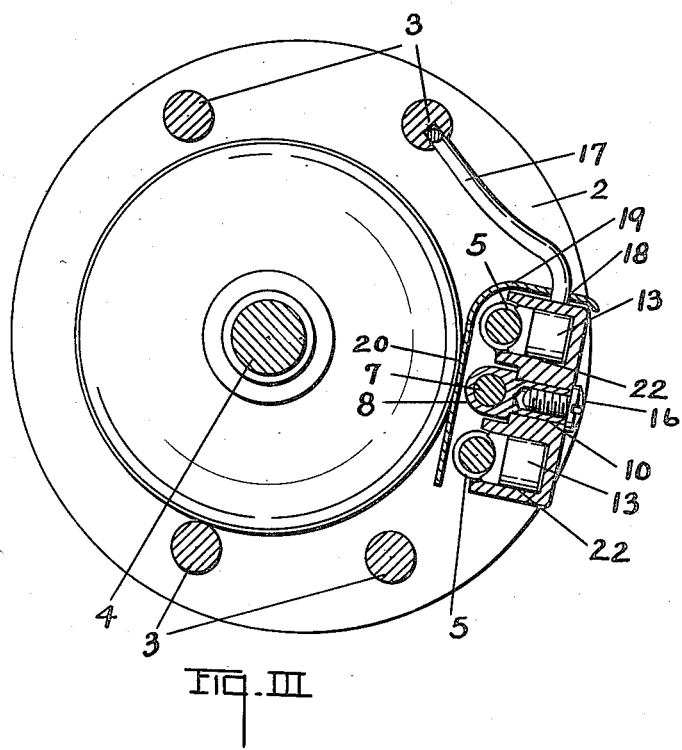

1,468,676

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed August 11, 1922. Serial No. 581,075.

*To all whom it may concern:*

Be it known that I, SAMUEL G. RUSSELL, a citizen of the United States, residing at the city and county of Kalamazoo, State of Michigan, have invented certain new and useful Improvements in Fishing Reels, of which the following is a specification.

This invention relates to improvements in fishing reels.

The main objects of this invention are:

First, to provide an improved fishing reel of the level wind type in which the line guide carriage is mounted to move very freely and without binding, although there is a pair of traversing shafts for driving the carriage.

Second, to provide an improved fishing reel of the level wind type which is very durable and not likely to get out of repair.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a front elevation of a fishing reel embodying the features of my invention.

Fig. II is a vertical transverse section on a line corresponding to the broken line 2—2 of Fig. I.

Fig. III is a transverse section corresponding to that of Fig. II showing a slight modification of my invention.

In the drawing the sectional views are taken looking in the direction of the little arrows at the ends of the section lines and similar numerals of reference refer to similar parts throughout the several views.

Referring to the drawing, 1 represents the chambered head of the reel and 2 the tail plate thereof. These are connected by suitable pillars 3. The spool 4 is preferably offset from the center or eccentrically disposed to accommodate the level wind mechanism.

I provide a pair of traversing shafts 5 disposed parallel and in spaced relation. These shafts are both reversely threaded. The driving connections for the crank 6 to the spool and to these traversing shafts are not illustrated as they form no part of my present invention. A satisfactory driving gear is illustrated in my application for Letters Patent filed September 27, 1921, Serial No. 503,566.

Between the traversing shafts and parallel thereto is a carriage slide rod 7 on which the carriage slide member 8 is slidably mounted. The line guide carriage 9 has an opening 10 therein adapted to receive the swivel-like portion 11 of this guide member.

In the embodiment shown in Figs. I and II the carriage is provided with openings 12 loosely embracing the shafts, that is, the openings are of such size that the carriage slides freely thereon and without binding. The carriage is supported by the guide member but is free for limited oscillating or pivotal movement under the action of the pawls 13 coacting with the shafts. These pawls are arranged in outwardly opening sockets 14 being retained therein by the plate 15, the plate being in turn retained by the screw 16 which is tapped into the carriage guide member and retains the carriage thereon. It will be understood that the oscillating or pivotal movement of the carriage is, under ordinary conditions, relatively slight but this compensates for inaccuracies in the forming and assembling of the parts, and prevents binding or clutching action of the oscillating parts in operation.

The line guide member 17 projects upward from the carriage through a slot 18 and the top portion 19 of the housing 20 which is disposed at the rear of the traversing shaft as shown in Fig. II, guarding the same from the line wound upon or passing to and from the spool. The housing thus arranged also may constitute a support member for the carriage, the line guide member being a sliding fit within the slot 18. This mounting for the carriage is also of very decided advantage in that it avoids the necessity for great accuracy in the forming and fitting of the parts.

In the modification shown in Fig. III the line guide carriage 21 has pawl sockets 22 closed at their outer ends, the carriage only partially embracing the traversing shafts. Otherwise, the structure is the same as that described and its operation is substantially the same, although the embodiment shown in Figs. I and II is preferred as it possesses greater strength and the pawls may be removed without removing the carriage.

My improved reel is very free in its operation and at the same time is strong and durable, and the parts are subjected to but little wear in use.

I have not attempted to illustrate or describe other embodiments or adaptations which I contemplate as I believe the disclosure made will enable those skilled in the art to which my invention relates to embody or adapt the same as may be desired.

Having thus described my invention what I claim as new and desire to secure by Letters Patent is:

1. In a fishing reel, the combination of a frame, a spool, a pair of traversing shafts disposed in parallel spaced relation, a carriage slide rod disposed between and parallel to said traversing shafts, a carriage guide member slidable on said rod, a line guide carriage having openings for said shafts and having pawl sockets open at their outer ends and an opening between said sockets pivotally engaging said guide member, pawls disposed in said sockets to coact with said shafts, a pawl retaining plate overlapping the outer ends of said pawl sockets, a screw tapped into said carriage guide member to retain said carriage and said plate, a housing for said traversing shafts and guide rod arranged at the rear thereof and having a top portion overhanging the same, said top portion being longitudinally slotted, and a line guide member on said carriage projecting upwardly through said slot.

2. In a fishing reel, the combination of a frame, a spool, a pair of traversing shafts disposed in parallel spaced relation, a carriage slide rod disposed between and parallel to said traversing shafts, a carriage guide member slidable on said rod, a line guide carriage having openings for said shafts and having pawl sockets open at their outer ends and an opening between said sockets pivotally engaging said guide member, pawls disposed in said sockets to coact with said shafts, a pawl retaining plate overlapping the outer ends of said pawl sockets, a screw tapped into said carriage guide member to retain said carriage and said plate, and a line guide member on said carriage.

3. In a fishing reel, the combination of a frame, a spool, a pair of traversing shafts disposed in parallel spaced relation, a carriage slide rod disposed between and parallel to said traversing shafts, a carriage guide member slidable on said rod, a line guide carriage associated with said guide member for limited pivotal movement and loosely engaging said shafts, pawls disposed in said sockets to coact with said shafts, a pawl retaining plate overlapping the outer ends of said pawl sockets, a screw tapped into said carriage guide member to retain said carriage and said plate, a housing for said traversing shafts and guide rod arranged at the rear thereof and having a top portion overhanging the same, and a line guide member on said carriage.

4. In a fishing reel, the combination of a frame, a spool, a pair of traversing shafts disposed in parallel spaced relation, a carriage slide rod disposed between and parallel to said traversing shafts, a carriage guide member slidable on said rod, a line guide carriage associated with said guide member for limited pivotal movement and loosely engaging said shafts, pawls disposed in said sockets to coact with said shafts, a pawl retaining plate overlapping the outer ends of said pawl sockets, a screw tapped into said carriage guide member to retain said carriage and said plate, and a line guide member on said carriage.

5. In a fishing reel, the combination of a frame, a spool, a pair of traversing shafts disposed in parallel spaced relation, a carriage slide rod disposed between and parallel to said traversing shafts, a carriage guide member slidable on said slide rod, a line guide carriage having opening for said shafts and pivotally engaging said guide member, pawls carried by said carriage coacting with said shafts, a housing for said shafts and guide rod arranged at the rear thereof and having a top portion overhanging the same, and a line guide member on said carriage.

6. In a fishing reel, the combination of a frame, a spool, a pair of traversing shafts disposed in parallel spaced relation, a carriage slide rod disposed between and parallel to said traversing shafts, a carriage guide member slidable on said slide rod, a line guide carriage having openings for said shafts and pivotally engaging said guide member, pawls carried by said carriage coacting with said shafts, and a line guide member on said carriage.

7. In a fishing reel, the combination of a frame, a spool, a pair of traversing shafts disposed in parallel spaced relation, a carriage slide rod disposed parallel to said traversing shaft, a carriage guide member slidable on said rod, a line guide carriage engaging said guide member for limited pivotal movement and operatively associated with said shafts, pawls carried by said carriage coacting with said shafts, a housing for said shafts and guide rod, and a line guide member on said carriage, said housing being longitudinally slotted to receive said line guide.

8. In a fishing reel, the combination of a frame, a spool, a pair of traversing shafts disposed in parallel spaced relation, a carriage slide rod disposed parallel to said traversing shaft, a carriage guide member slidable on said rod, a line guide carriage engaging said guide member for limited pivotal movement and operatively associated with said shafts, pawls carried by said carriage coacting with said shafts, and a line guide member on said carriage.

9. In a fishing reel, the combination of a frame, a spool, a traversing shaft, a carriage slide rod disposed parallel to said traversing shaft, a carriage guide member slidable on said rod, a line guide carriage engaging said guide member for limited pivotal movement and operatively associated with said shaft, a pawl carried by said carriage coacting with said shaft, a housing for said shaft, and a line guide member on said carriage, said housing being longitudinally slotted to receive said line guide.

10. In a fishing reel, the combination of a frame, a spool, a traversing shaft, a carriage slide rod disposed parallel to said traversing shaft, a carriage guide member slidable on said rod, a line guide carriage engaging said guide member for limited pivotal movement and operatively associated with said shaft, a pawl carried by said carriage coacting with said shaft, and a line guide member on said carriage.

In witness whereof I have hereunto set my hand and seal.

SAMUEL G. RUSSELL. [L. S.]